UNITED STATES PATENT OFFICE.

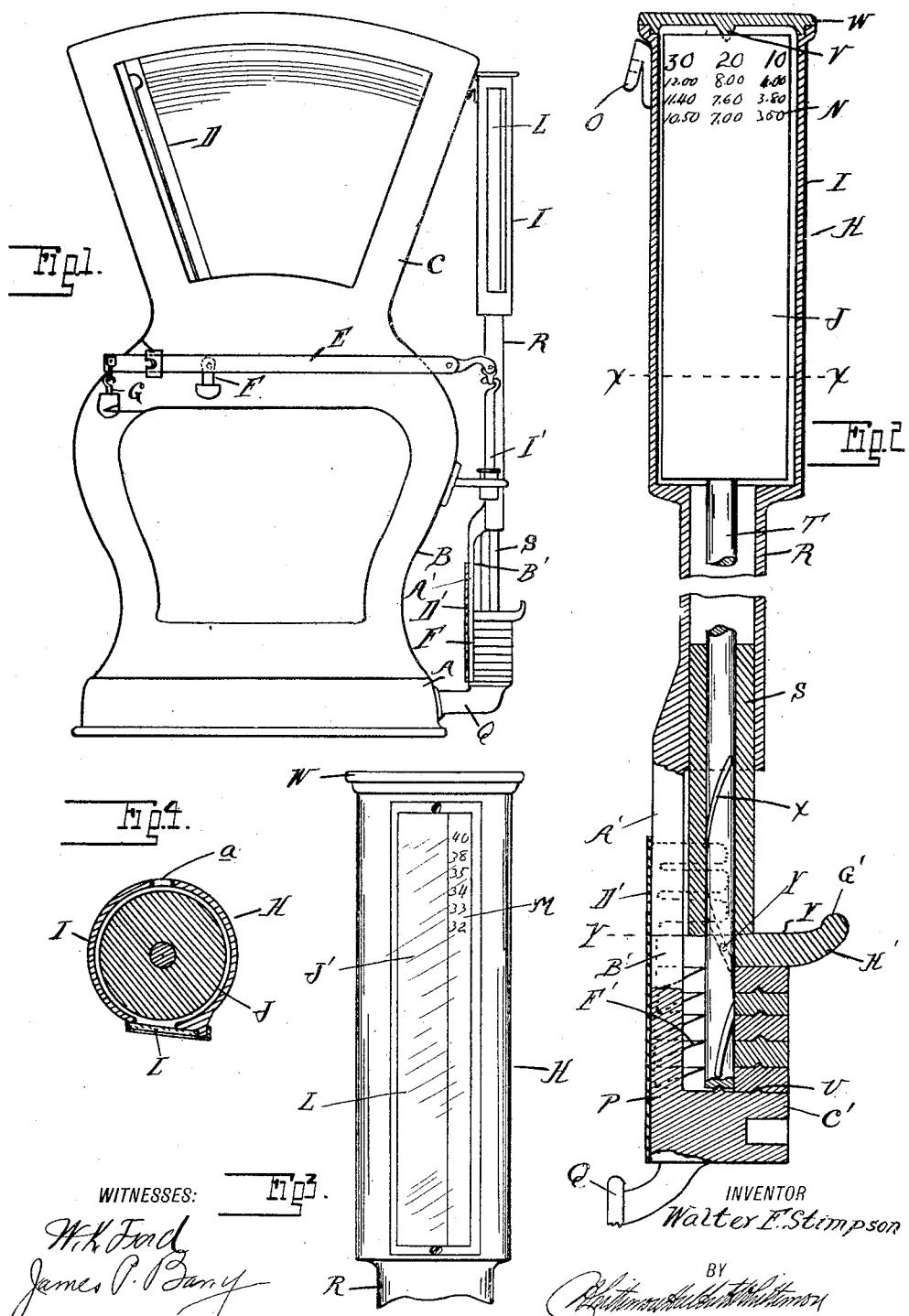

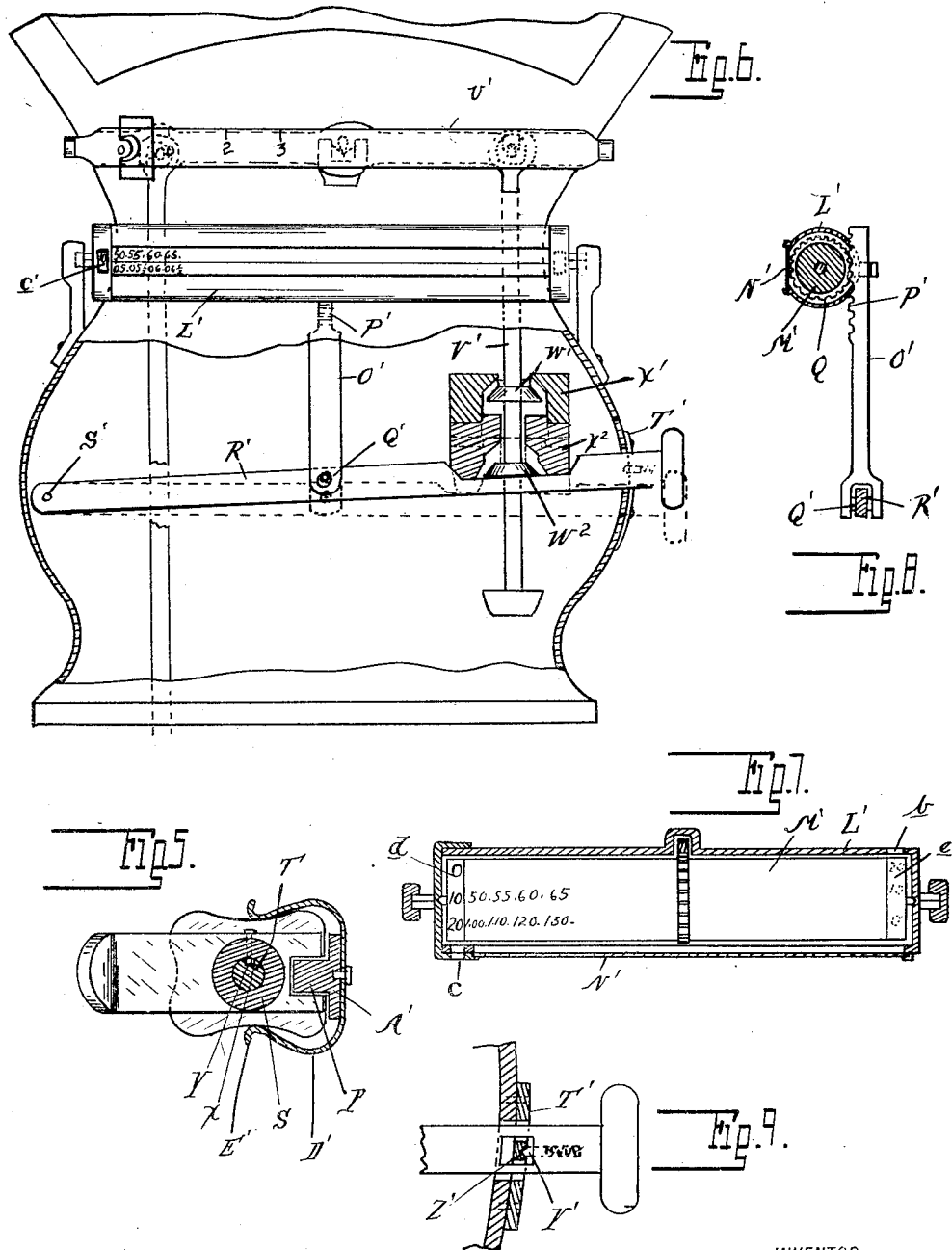

WALTER F. STIMPSON, OF DETROIT, MICHIGAN.

COMPUTING-SCALE.

1,367,213.

Specification of Letters Patent.

Patented Feb. 1, 1921.

Application filed November 25, 1914. Serial No. 873,893.

*To all whom it may concern:*

Be it known that I, WALTER F. STIMPSON, a citizen of the United States of America, residing at Detroit, in the county of Wayne and State of Michigan, have invented certain new and useful Improvements in Computing-Scales, of which the following is a specification, reference being had therein to the accompanying drawings.

The invention relates to computing scales, and resides in the provision of a novel and simple construction of computing mechanism associated with the tare beam, which when the weight applied to the tare beam is varied, will provide proper computation for such variation in the tare beam weight; and further, in certain details of construction and arrangement and combination of parts as will more fully hereinafter appear.

In the drawings,—

Figure 1 is a rear elevation of a scale embodying the invention;

Fig. 2 is a vertical central section of the computing mechanism for the tare beam;

Fig. 3 is an elevation of a portion of such computing mechanism;

Figs. 4 and 5 are sections on lines *x—x* and *y—y* of Fig. 2; and

Figs. 6, 7, 8 and 9 illustrate modifications.

A designates the base frame having a portion B extending upwardly therefrom, and C is the usual computing section for the index hand D. E is the weighing beam fulcrumed at F upon the upward extension B, and G is the steelyard rod connecting the weighing beam with the platform levers.

With the constructions of scales now in general use a given unit is employed for the computing chart and the tare beam, this unit usually being ten pounds. The computing chart for the index hand will indicate the cost of various prices per pound of an article of any weight up to and including a predetermined unit, but if the article weighs more than one unit an additional weight is added to the weighing beam. In such case, however, the chart computes for only that fraction of a unit of weight over and above the unit or units of a weight applied to the tare beam.

By my improvement I provide a construction of computing mechanism by which, upon the variation of the units of weight applied to the tare beam, not only is there presented to view computations compiled in accordance with the particular unit or units of weight applied to the tare beam, but also computations for fractions of a unit of weight.

The invention is capable of being embodied in various structures, and while I have shown in the drawings two novel and desirable constructions, I do not desire to limit the protection to the particular structures illustrated.

Referring to the arrangement shown in Fig. 1 to 5 inclusive. H is a computing section composed of a casing I within which is arranged for rotation a cylinder J. Within the casing and beneath the transparent panel L is a row M of price numerals as 40, 38, 35, etc., for the price per pound, while at the top of the cylinder are the numbers 10, 20, 30, etc., indicating the units of weight. Beneath each of the indications for the units of weight is a column N of indications giving the value of such unit at the various prices per pound shown in column M. Upon rotation of the cylinder J the various columns N will be exposed to view through the transparent panel, when brought into registration with the column N. The transparent panel is of sufficient width to expose but one column N at a time. The casing I is provided with an arm O which is attached to the section C, while the lower end of the casing I is connected to a weight support P. The latter has an arm Q that is bolted or otherwise suitably connected to the base frame A. R is a tubular extension of the casing I within which is arranged for longitudinal sliding movement a follower S. T is a shaft connected to the cylinder J, extending through the member S and adapted to turn therein. The lower end of the member T is journaled upon a pointed bearing U on the weight support, while the upper end of the cylinder J engages a pivot point V on a cap W that closes the upper end of the casing I. The shaft T has a spiral groove X therein within which is arranged a lug Y on the lower end of the member S. The latter is held against turning within the extension R by means of a guide A' that engages a bifurcated portion B' at the lower end of the member S. The extra weights for the beam E are arranged intermediate the base C' of the weight support and the lower end of the member S, as shown in Fig. 2, and the latter is free to lower whenever a weight is removed from the support C'. Preferably the weight support is provided with a guide rack D' having resilient fingers E' adapted to retain the weights in place. In order to facilitate the replacing of the weights upon the rack the latter are provided with a beveled portion F' at the forward edge thereof, and the lower end of the member S is provided with a foot G' that has its outer edge beveled as indicated at H', the foot G' being of a width to engage the beveled portion F'. The parts are so proportioned that the removing of a weight from the rack P or the replacing of a weight upon the rack will effect a rotation of the cylinder J equal to the distance between two columns. When all the weights are upon the rack G' the zero column J' on the cylinder J is in registration with the sight opening. Upward or downward movement of the member G' will—because of the pin Y in the spiral slot X—effect a rotation of the cylinder J.

In operation of the construction so far described, assuming the unit of weight is ten pounds and an article of fifteen pounds weight is placed upon the scale, since when all the weights are upon the rack P the scale only weighs to ten pounds, it will be necessary to remove one of the extra weights from the rack P and place it upon the counter-poise rack I'. The removal of a weight from the rack P will cause the cylinder J to be turned to position the ten pound column beneath the transparent panel, and when the weight is upon the rack I' the computing section H will indicate to the operator the price for ten pounds, while the computing section C for the index hand will indicate to the operator the price for five pounds. To obtain the total price it is merely necessary to add the proper computation on the computing section H to that of the computing section C. If two or more weights are removed from the rack P the cylinder J will be correspondingly shifted, and whenever the weight is removed from the rack I' and replaced upon the rack P, the cylinder J will be returned to its proper position. The operation of the computing section H is, therefore, automatically controlled by the variation in the weight applied to the beam E.

In the construction shown in Figs. 6 to 9 inclusive, the indicating section comprises a casing L' within which is arranged for rotation a cylinder M', the casing L' having a sight opening N' and the casing L' and cylinder M' being provided with indications of the same general nature as described in connection with Figs. 1 to 5 inclusive, with the exception that the indications run longitudinally of the roll instead of vertically. The roll is operated by means of a lever O' having at its upper end a rack P' that engages a pinion Q' attached to the cylinder M'. The lower end of the member O' is pivotally connected at Q' to a lever R'. The latter is pivoted at one end at S' to the casing, while the opposite end of the lever has an adjustable connection with an index rack T' upon the casing. Pivotally connected to the weighing beam U' is a counter-poise rack V' that extends downwardly within the casing. This rack is provided with a plurality of spaced collars, two being shown in the drawings, W' W², for engaging counter-poise weights X' X². These weights are normally supported upon the lever R'. When the latter is at the position shown in full lines in Fig. 6, the collars W' do not engage the weights X' and therefore the beam U' is not subjected to the counter-poise weights. When the outer end of the lever R' is moved to the position marked 10 on the index rack, the weight X' will rest upon the collar W' and the weighing beam U' will therefore be subjected to this counter-poise weight. The weight X² however, is still supported by the lever R'. When the outer end of the latter is shifted to the position marked 20, both the weights X' and X² will be carried by the member V'. Upon the raising or lowering of the lever R' the member O' will be correspondingly raised or lowered, which through the medium of the rack P' and gear Q will effect a proper shifting of the cylinder M' to present to view the desired computations.

Any suitable manner of retaining the outer end of the lever R' in its adjusted position may be employed. The structure shown in the drawings comprises a spring-pressed dog Y' that is adapted to engage recessed portions Z' in the member T'.

In the modification just described, as with the structure shown in Figs. 1 to 6 inclusive, whenever the weight applied to the weighing beam is varied, the computing section for such beam is automatically adjusted to present to view proper computations.

It is desirable to have the amount of the weight or weights applied to the weighing beam indicated to the customer. In the construction shown in Figs. 1 to 6 inclusive, a row of computations A² is placed around the upper end of the cylinder J and are adapted to be brought successively into registration with the sight opening $a$ on the front side of the casing I. In the construction shown in Figs. 7 to 10 inclusive the cylinder M' is provided adjacent one end thereof with a row of computations $e$ that are adapted to register with a sight opening $b$ at the front of the casing L'. Preferably the rear side of the casing L' is provided with a second sight opening $c$ with which another row of computations $d$ is adapted to register.

What I claim as my invention is:—

1. In weighing mechanism, a weighing beam, a computing device therefor, comprising a casing, a cylinder journaled to turn in said casing, a weight support, a follower carried by the weight support, and a connection between said follower and said cylinder for effecting a rotation of the latter upon a longitudinal movement of the follower, and computations upon said cylinder, and a sight opening in said cylinder with which said computations are adapted to register.

2. In weighing mechanism, a weighing beam, a computing device therefor comprising a casing, a cylinder journaled to turn in the casing, a shaft connected to the cylinder to turn therewith, a longitudinally movable follower, a connection between said follower and said shaft for turning the latter upon the longitudinal movement of the follower, a weight support, weights upon said support on which the follower is adapted to rest, computations upon said cylinder, and a sight opening in said cylinder with which said computations are adapted to register.

3. In weighing mechanism, a weighing beam, a computing device for said beam, comprising a casing having an extension, a cylinder journaled in said casing, a shaft connected to one end of said cylinder and projecting into said extension, a follower arranged in said extension for longitudinal movement, a pin and spiral slot engagement between the follower and the shaft, a weight rack connected to said extension, weights upon said rack upon which said follower is adapted to rest, computations upon said cylinder, and a sight opening in said cylinder with which said computations are adapted to register.

4. In weighing mechanism, a weighing beam, means for varying the weight applied to the beam, a computing device for the weighing beam comprising a casing having sight openings viewable from opposite sides thereof, an adjustable member within the cylinder having computations adapted to register with one of said sight openings and having weight indications adapted to register with the other sight opening, and means for adjusting said member upon a variation of the weight transferred to active use for the beam.

5. In a computing device for weighing scales, the combination with two coacting relatively movable members, one of which carries figures and the other computations involving said figures, of a member for actuating relative motion of the first named members, acted upon by a force tending to move it in a certain direction and a plurality of weights, normally in the path of said actuating member and separately removable from their normal positions to allow successive displacements of said member.

6. In a computing device for weighing scales, the combination with two coacting relatively movable members, one carrying figures and the other computations, involving said figures, of a rectilinearly movable member for actuating relative motion of the first-named members, acted upon by a force tending to move it in a certain direction, a support, and a plurality of weights upon said support, opposing motion of the actuating member and separately transferable to another part of the mechanism from said support to allow successive displacements of said member.

7. In a computing device for weighing scales, the combination with two coacting relatively movable members, one of which carries figures and the other computations involving said figures, of a member actuating relative motion of the first-named members, acted upon by a force tending to move it in a certain direction, a support, a plurality of weights upon said support opposing motion of the actuating member and separately removable from said support to allow successive displacements of said member, resilient members carried by the support for separately engaging each weight and a handle member projecting from the actuating member.

In testimony whereof I affix my signature in presence of two witnesses.

WALTER F. STIMPSON.

Witnesses:
Wm. J. Belknap,
James P. Barry.